Aug. 29, 1967 — M. DENENBERG — 3,338,270
LAMINATED TUBING
Filed May 3, 1965 — 2 Sheets-Sheet 1
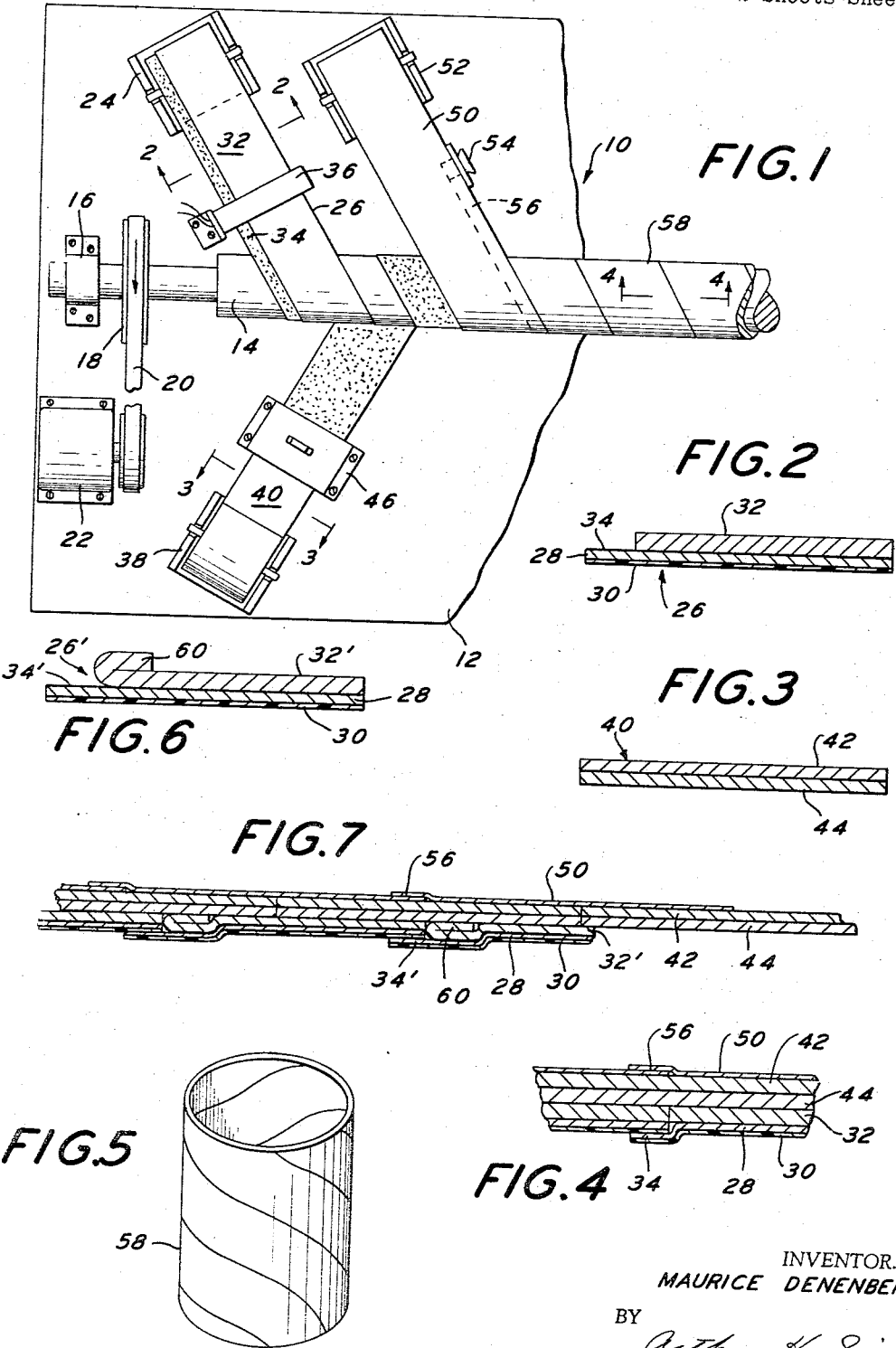
INVENTOR.
MAURICE DENENBERG
BY Arthur H. Seidel
ATTORNEY

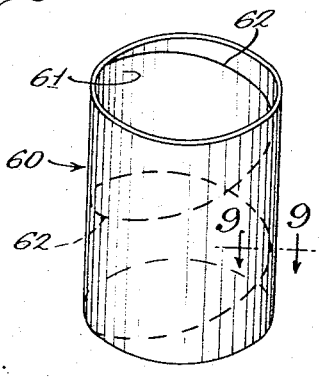
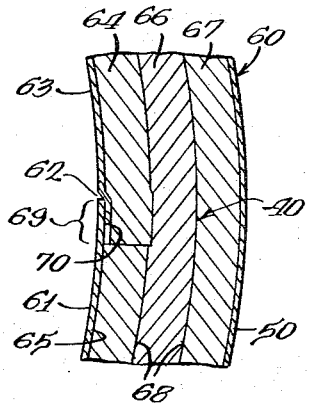
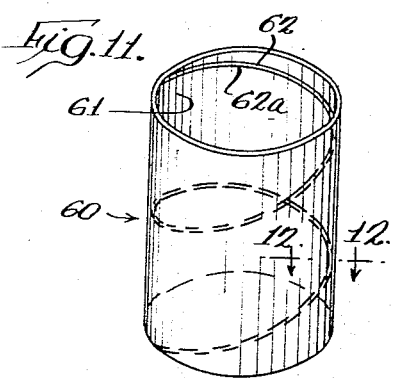
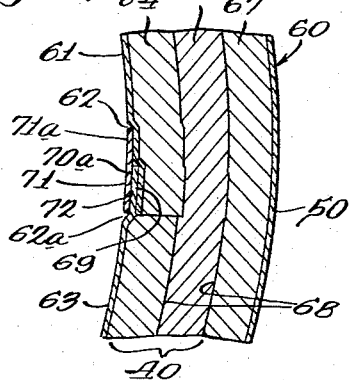
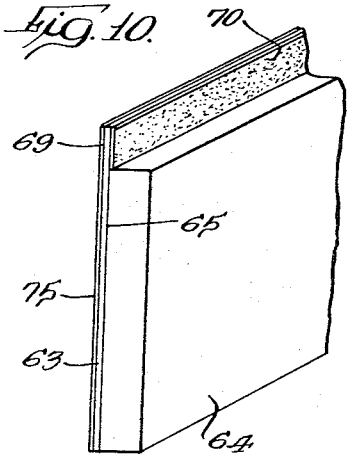
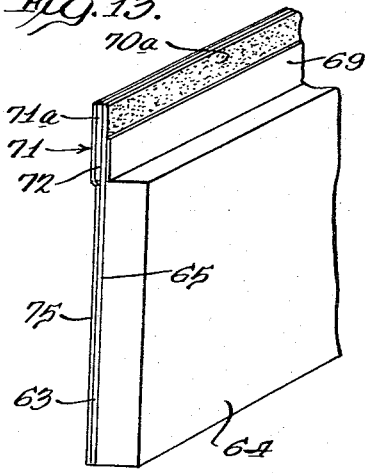

United States Patent Office 3,338,270
Patented Aug. 29, 1967

3,338,270
LAMINATED TUBING
Maurice Denenberg, 20th and Washington Ave.,
Philadelphia, Pa. 19146
Filed May 3, 1965, Ser. No. 456,030
15 Claims. (Cl. 138—144)

This application is a continuation-in-part of my copending applications Ser. Nos. 171,009 and 273,806, filed Feb. 5, 1962, and Apr. 15, 1963, respectively, and entitled, "Container Tubing," and "Laminate Article and Method of Making Same," respectively, wherein it is proposed to manufacture container tubing by spiral winding laminate strips while providing an overlap of the strips during spiral winding in the form of a flap of a nonporous layer of the laminate strip at the innermost spiral wound surface so that a continuous inner surface of nonporous material is provided.

This invention relates to lightweight tubing from which lightweight containers may be made and to laminate materials for forming such tubing. More particularly, this invention relates to tubing and to a laminate strip for forming the tubing by spiral winding wherein the laminate strip includes a nonporous layer laminated to a backing material with the nonporous layer left unbacked along an edge portion thereof to define an edge flap, and in one form, also relates to the strengthening of such edge flap.

It is an object of the present invention to provide a novel spirally wound tubing adapted for use as container bodies.

It is another object of the present invention to provide a novel tubing spirally wound from laminated material.

It is another object of the present invention to provide a spirally wound tubing having an imperforate, waterproof inner and outermost layer.

It is another object of the present invention to provide a spirally wound tubing wherein the inner and outermost layers are a nonporous material with an overlapping joint between the nonporous material on the innermost and outermost layers.

Also it has been found in the handling of laminate strips having edge flaps in roll form or otherwise, care should be taken to prevent deformation or destruction of the very thin edge flap. Further, when it is desired to spiral wind and seal joints of tubes using such strips, it has been necessary to apply a coating of adhesive material to the flap for adhering the flap to an adjacent convolution of the strip material, e.g. by providing an adhesive roller, brush or the like, in line with the spiral winding system.

It is a further object of the present invention to provide a new and useful laminate structure in the form of a tubing adapted for use in forming container bodies and further to provide a tubular structure made by spiral winding such laminate.

It is another object of the present invention to provide such a new and useful spiral wound tubular structure having a nonporous, and preferably nonabsorbent, innermost layer which may protect subsequent overlying layers from the contents of the tube.

It is more specifically an object of the present invention to provide a new and useful form of laminate strip, and a spiral wound tube made therefrom, wherein the strip includes an edge flap of nonporous material and wherein the edge flap has an adhesive coating, preferably a dried adhesive coating of sufficient thickness to improve the strength or stiffness of the flap, and especially wherein the adhesive is applied on the facing of the flap facing away from the nonporous surface to be used as an innermost layer in the tubing.

Other objects will be apparent from the following descriptions and the drawings in which:

FIGURE 1 is a partial top plan view of an apparatus adapted to make spirally wound tubing;

FIGURE 2 is a sectional view taken along the lines 2—2 in FIGURE 1;

FIGURE 3 is a sectional view taken along the lines 3—3 in FIGURE 1;

FIGURE 4 is a sectional view of tubing taken along the lines 4—4 in FIGURE 1;

FIGURE 5 is a perspective view of a piece of tubing made in accordance with the present invention and cut to a length suitable for use as a can body;

FIGURE 6 is a sectional view comparable to FIGURE 2, but illustrating another embodiment of the innermost laminate;

FIGURE 7 is a sectional view similar to FIGURE 4 illustrating the cross section of a tubing made with the innermost laminate illustrated in FIGURE 6;

FIGURE 8 illustrates a form of spiral wound tubing embodying the present invention;

FIGURE 9 is an enlarged section through a seam of the innermost layer of tubing of FIGURE 1 along line 2—2;

FIGURE 10 is an enlarged perspective view from one end of a strip of laminate which may be spirally wound to the configuration of FIGURE 1;

FIGURE 11 illustrates another form of spiral wound tubing embodying the present invention;

FIGURE 12 is an enlarged section through a seam of the innermost layer of FIGURE 4 along line 5—5; and FIGURE 13 is an enlarged perspective view from one end of a strip of laminate which may be spirally wound to the configuration of FIGURE 4.

While this invention is susceptible of embodiment in many different forms, there are shown in the drawings and will herein be described in detail forms of the invention with the understanding that the present disclosure is to be considered as an exemplification of the principles of the invention and is not intended to limit the invention to the forms illustrated.

In one aspect, this invention provides container tubing such as described in said application Ser. No. 171,009. Such tubing of the present invention is composed of a plurality of layers, including porous and nonporous material, laminated together and spirally wound. The innermost and outermost layers of the tubing of the present invention are preferably thin imperforate, waterproof layers such as layers of metal foil or plastic film. The innermost layers overlap each other and are preferably bonded to each other. If desired, the innermost layer can be a laminate of wax on one surface of a nonporous layer and can have a porous layer adhesively bonded to the opposite surface of the nonporous layer.

The inner and outermost layers of the tubing of the present invention are preferably made from a nonporous material such as metal foil so that the tubing may be utilized to manufacture can bodies or containers which are capable of containing a liquid and are also capable of being disposed in a moisture laden atmosphere without any deterioration or collapsing of the walls of the container. While the containers made from the tubing of the present invention are capable of performing the functions of containers proposed heretofore, the containers made from the tubing of the present invention will be substantially lighter in weight thereby reducing shipping costs. By way of example, the containers made from the tubing of the present invention can be utilized as oil cans, beer cans, etc.

The provision of an innermost layer of metal foil may present problems in winding the layers of the tubing around a metal or plastic surfaced mandrel. Metal to metal or plastic contact may result in a substantial amount of friction which materially decreases the production rate of the tubing. This friction can be reduced by applying a slip coat, preferably a coating of carnauba wax to the innermost surface of the innermost layer of metal foil. Where carnabau wax is used, it is dissolved in an organic solvent and means are provided to increase the temperature of the wax before the innermost layer is wrapped around the mandrel thereby reducing the friction qualities of the wax.

Referring to the drawing in detail, wherein like numerals indicate like elements, there is shown a portion of an apparatus designated generally as 10.

The apparatus is adapted to make spirally wound tubing by wrapping layers around a rotating mandrel. The apparatus 10 includes a horizontally disposed support 12 and a mandrel 14 mounted for rotation about an axis spaced above the support 12. The mandrel 14 has one end extending through and supported by a rotary bearing 16. A sheave 18 is secured to the mandrel 14. An endless drive belt 20 extends around the sheave 18 and the output shaft of a motor 22.

An unwind stand 24 is supported on the support 12. The unwind stand 24 supports a roll of a laminate shown at 26. As shown more clearly in FIGURE 2, the laminate 26 includes a thin layer of metal foil 28 having one surface thereof coated with a layer of wax 30. A layer of paper 32 is adhesively secured to the opposite surface of the layer 28 from the layer of wax 30. Since the layer 32 is provided with a width less than the width of layer 28, the layer 28 is provided with a flap portion 34 extending along one side edge thereof. Layer 28 may alternatively be a plastic film or the like. Suitable plastic films, as well as adhesives, are more fully exemplified hereinbelow in the descriptions of the forms of FIGURES 8–13, and such can be used in the embodiments of FIGURES 1–6.

The entire surface of the layer 28 juxtaposed to the layer 32 is coated with a layer of adhesive. The laminate 26 will be wrapped around the mandrel 14 with a layer 30 juxtaposed to the outer peripheral surface of the mandrel 14. Before being wrapped around the mandrel 14, the laminate 26 will pass through a heater 36. The heater 36 is an electric heater which raises the temperature of the layer of wax 30 to a temperature between 150° F. and 200° F. thereby reducing the friction of the layer of wax 30.

An unwind stand 38 is mounted on the support 12 on an opposite side of the mandrel 14 from the unwind stand 24. The unwind stand 38 is adapted to contain a roll of a laminate 40. The laminate 40 comprises a layer of paper 42 adhesively secured to a layer of paper 44 as shown more clearly in FIGURE 3. The laminate 40 is preferably passed through an adhesive applicator 46 before being wound around the innermost layer formed by wrapping the laminate 26 on the mandrel 14. The adhesive applicator 46 preferably applies a coating of adhesive to opposite surfaces of the laminate 40.

An unwind stand 52 is mounted on the support 12 adjacent the unwind stand 24. The unwind stand 52 is adapted to rotatably support a roll of metal foil 50. An adhesive applicator 54 is mounted between the mandrel 14 and the unwind stand 52 in a manner so as to apply a narrow strip of adhesive 56 along the leading edge of the layer of metal foil 50. The width of the strip of adhesive 56 corresponds with the width of the overlapping joint between the spirally wound portions of the outermost layer.

The forming of the tubing 58 so that it will be spirally wound, the manner of removing the tubing 58 from the mandrel 14, the provision of a tightener belt which causes the various layers of the tubing 58 to be pressed against one another to cause the adhesive to form a bond, and the provision of a cutting apparatus for cutting the tubing 58 into particular lengths are all well known to those skilled in the art. Hence, it is not deemed necessary to describe these features in detail.

When the tubing 58 is formed from the various laminates described above, the tubing 58 will appear in longitudinal cross section as illustrated in FIGURE 4. Hence, it will be noted that the metal foil 28 will be in overlapping relation with itself and adhesive therebetween. Since the metal foil 28 is overlapping and adhesively secured to itself, a waterproof innermost layer will be provided. The layers 32, 42, and 44 are preferably made of paper and provide sufficient rigidity to the tubing so that it may be utilized as a container body. The layer of wax 30 provides a waterproof seal in addition to the seal between the overlapped layer of metal foil 28.

It is to be emphasized that the cross-sectional views illustrated in the drawing are merely for illustration purposes. While the overlapped joint may appear to be objectionable due to its size, in actual practice the location of the overlapped joint of the metal foil 28 and the metal foil 50 are difficult to ascertain. In this regard, the metal foil 28 and 50 are preferably made from foil having a thickness of between .00025 inch and .004 inch. The metal foils 28 and 50 are preferably a lightweight noncorrosive metal foil such as aluminum foil. In actual practice, the thickness of the layer of metal foil 28 is at least twenty-five times as thick as the layer of wax 30. Hence, it will be seen that the thickness of the layer of wax 30 is approximately the same thickness as the print on a page of printed matter. The manner in which the layer of wax 30 is applied to the layer of metal foil 28, per se, forms no part of the present invention since the two layers are commercially available under the trademark Sur-Slip.

In FIGURE 6, there is disclosed an alternative embodiment for the laminate 26. In the laminate 26, the layer of paper 32' will be initially of the same width as the layer of metal foil 28. However, the side edge portion 60 of the layer 32' will be folded back over itself thereby forming the flap portion 34'. The folded edge portion 60 provides an additional reinforcing layer which increases the strength of the tubing 58. When a tubing is formed with the laminate 26' being the innermost laminate, the tubing will appear in longitudinal cross section as illustrated in FIGURE 7.

In FIGURES 8 and 11 there are illustrated portions of still other forms of spirally wound tubes cut to can length. The tubes are generally indicated by reference numeral 60 and include generally continuous innermost surfaces 61 which are of a nonporous nature. In the tubing of FIGURE 8, each convolution of the spirally wound inner surface includes a single spiral seam line 62 while in the form of FIGURE 11, two such spiral seam lines 62 and 62a are included in surface 61.

Considering especially FIGURE 9, it will be seen that the tubing wall of the tube of FIGURE 8 is constructed of a plurality of layers. The innermost layer 63 is of nonporous material, such as, for example, may be selected from the class consisting of metal foil and plastic film. Layer 63 is preferably a noncorrosive and nonabsorbent material, with respect to the substance to be contained within the tubing. Layer 63 is backed by a layer of backing material 64 which may be normally porous or absorbent material, e.g. paper. In the illustrated form, layer 63 has a thickness of about 2 mils and layer 64 has a thickness of about 17 mils, although other thicknesses may be used as desired. Preferably, layer 63 is very thin since the nonporous materials used for such a layer are usually relatively expensive compared with porous materials which may be used for layer 64.

The next two outer layers 67 and 66 are also of backing material, paper. Layers 66 and 67 are bonded to each other by a suitable adhesive 68, and the adhesive 68 is also used to bond the inner surface of layer 66 to the outer surface of layer 64. Layer 63 is bonded to backing layer 64 by means of a suitable bonding material 65 of the type for bonding foil or film to paper.

Turning now to FIGURE 10, the laminate strip of the present invention, from which a tubing 60 may be wound, includes the layer 63 laminated to layer 64 by adhesive 65. Porous layer 64 is narrower than the nonporous layer 63, thereby defining a flap 69 overhanging one edge of layer 64. In accordance herewith, an amount of adhesive material 70 is applied to the flap sufficient to improve the flap strength. In the form of FIGURE 10, adhesive 70 is applied to the same surface of the flap portion 69 of layer 63 as is the backing material layer 64.

Considering now FIGURE 13, the laminate strip, which is used to make the tubing of FIGURES 11 and 12, includes a narrow strip or tape 71 of nonporous material, e.g., the same material as layer 63 and/or the same thickness as layer 63, and the layer of adhesive applied thereto for stiffening strip or tape 71 is identified by reference numeral 70a. It will be noted in the form of FIGURE 13 that the strip or tape 71 is bonded to flap 69 and serves to stiffen the flap 69. Strip 71 also serves to define a second flap structure or portion 71a extending beyond and stepped from the original flap 69. Adhesive 70a is applied to and strengthens the extending flap portion 71a of strip or tape 71.

Referring now to both FIGURES 10 and 13, the laminate structures shown therein, to the extent of providing the laminate of layers 63 and 64 with flap 69, may be formed by procedures described in my above identified copending application Ser. No. 273,806. As to FIGURE 10, the adhesive layer 70 may be applied to flap 69 in stiffening thickness by brush, roller, extrusion coating, spray, or the means well known in the art for applying adhesive coatings. The adhesive coating may be applied in line during production of the laminate of layers 63 and 64, after formation of flap 69 and prior to rolling of the laminate on a reel. As to FIGURE 13, the structure may also be prepared in line with the laminate producing system of my aforementioned application Ser. No. 273,806, by applying a strip of tape 71 to the surface of flap 69 after formation of flap 69, e.g. prior to rolling on the reel. The tape 71 may be applied to the surface of layer 63 to overlap the edge of flap 69 by any suitable means such as extrusion coating in the case of plastics, heat seal, adhesives, etc., and the overlapping or extending portion of tape 71 may thereafter be coated with adhesive 70a in the same manner as flap 69 of FIGURE 10 is coated. Tape 71 may also be applied by precoating one entire surface with adhesive 70a and affixing the adhesive coated tape 71 to flap 69 so that portion 71a of the tape 71, having adhesive coating 70a, overlaps the edge of flap 69. After coating of the structure with the layer of adhesive 70 or 70a, the adhesive layer may advantageously be dried by an inline heater blower or the like, at a temperature sufficient to evaporate solvents from the adhesive.

In producing the laminated strip, it may be desirable to apply a thin coating of slip coat material such as shown by reference numeral 75 to the surface of the laminate structure which is to be disposed against the mandrel. Wax, such as carnauba wax, for example, is suitable as the slip coat.

Layer 63 is a nonporous material having the desired surface for the innermost layer of the tubing. Any nonporous material may be used although the preferred materials are the metal foils and plastic films, e.g, polyethylene, polypropylene, nylon, aluminum foil, etc. Usable nonporous materials will be apparent to those in the art.

Adhesives for the adhesive layer 65, for bonding metal foil or plastic film sheets to paper or other backing sheets, are known to those in the art. An example of a suitable adhesive for bonding aluminum foil to paper is Borden NT–565, a case in neoprene latex adhesive. An example of adhesive for bonding plastic film (e.g. polyethylene or polypropylene) to paper is ethylene vinylacetate copolymer adhesive with small amounts of paraffin wax, usually applied as about 20% in toluene or other solvent. The adhesives for layers 68 for bonding paper to paper are numerous and readily available.

The adhesive for bonding tape 71 to flap 69 should be of the metal-to-metal, plastic-to-plastic or plastic-to-metal type. As examples, epoxy resins and synthetic resin-rubber complexes are available for each of these bonding uses. Additionally, polyvinylacetate adhesives may be used to bond metal foil to metal foil and acrylic adhesives are available for bonding metal foil to plastic film.

The adhesive composition of layer 70 or 70a is of the type used in bonding foil to foil, film to film or foil to film depending upon the composition of layer 63 or layer 63 and layer 71. The adhesive 70 or 70a may be a heat seal or hot melt or other adhesive which can be applied during manufacture of the laminate strip. Preferably, the adhesive is in solidified form as a normally solid adhesive which is liquifiable with heat. The dried or solidified adhesive layer on the laminate flap serves to stiffen or strengthen the edge of the laminate strip at the flap where the edge is only of foil or film thickness and constitutes only a metal foil or a plastic film. The adhesive may be applied as a heated liquid phase and then permitted to solidify by cooling; when joining the flap portion of the inner structure of the tube to the inner surface of the edge of the next adjacent convolution during spiral winding, the adhesive 70 or 70a on flap 69 or strip 71 is heated until tacky and permitted to resolidify between the joined surfaces.

The provision of the layer of adhesive on the edge flap of the nonporous material strengthens the flap against unintentional multilation during handling of the strip material and also assures that the flap is in a generally straight flange condition when wound as a portion of the innermost layer on a mandrel. For this purpose, the layer of adhesive is preferably at least one mil in thickness, e.g. one to two mils. Further, in using the laminate strip with the flap strengthened with adhesive material, it is unnecessary to apply an adhesive material to the flap during the spiral winding process. In the finished tubing, a nonporous, e.g. aluminum-to-aluminum seal is provided which is impervious to the contents of the tube. In this respect, care should be taken where the container is to be used for containing liquid ingredients that the adhesive material on the flap be selected with respect to any effect the liquid may have upon the adhesive. The adhesive should be nonreactive with the contained liquid or other material, should be insoluble in the contained liquid or other material and should be generally inert and imprevious with respect to any contained material. It will be apparent that the tubing provided in accordance herewith may be cut to desired length and capped within caps for manufacturing cans which may be used as oil cans, beer cans or the like while presenting an impervious innermost layer to the can contents. The foil or film for the innermost layer 63 may also be selected with respect to activity on the foil or film by the can contents. The suitable materials for a particular application will be apparent to those skilled in the art, or such materials may be simply tested by contact with the liquid to be contained to determine the activity prior to their use.

For understanding spiral winding using the laminates of FIGURES 10 and 13 for producing tubing of FIGURES 8, 9 and 11, 12, reference is again made to FIGURE 1. The unwind stand 24 supports the roll of laminate 26 which may be, for example, either of the above described laminate structures of FIGURES 10 or 13. Laminate 26 may have one surface thereof coated with a layer of slip coat material 75, e.g. wax or the like. The slip-coated surface will correspond to the innermost surface of the tubing structure after spiral winding and is opposite the surface to which the paper layer 64 is bonded.

Alternatively, mandrel 14 may have a slip surface by virtue of an applied slip coat or by virtue of the nature of the material of construction of the mandrel. In the form shown, the laminate will be wrapped around the mandrel 14 with layer 75 juxtaposed to the outer peripheral surface of the mandrel 14. Before being wrapped around the mandrel 14, the laminate 26 may be passed through heater 36, as described above where a wax slip coat is used. Heater 36 also serves to heat the heat seal adhesive layer 70 or 70a on flap 69 or strip 71 to sealing temperature. Although in the system illustrated in FIGURE 1 a heater 36 is used to heat the adhesive layer to tackiness, the heat of the mandrel itself may be sufficient for this purpose. Other heating provisions may be made as described, in lieu of heater 36.

The roll of material 40 on unwound stand 38 may be a flexible strip of paper or paper laminate or the like, or may be a backing material of any desired composition, such as a laminate of layers 66 and 67. The material 40 is preferably passed through the adhesive applicator 46 for applying a coating of adhesive to opposite surfaces of the material 40, before being wound. The unwind stand 52 rotatably supports the roll of material 50 for forming the outermost layer of the tube. The outermost layer is preferably a nonporous material as described hereinabove, e.g. metal foil or plastic film, although porous materials may be used if the outer surface of the tubing can be porous. The adhesive applicator 54 applies the narrow strip of adhesive along the leading edge of the layer 50.

When the tubing is formed from the laminates of FIGURE 10 or 13, the tubing will appear as illustrated in FIGURES 8 and 9 or 11 and 12, depending on the laminate strip 40 used during winding. It will be noted that the innermost metal foil or plastic film, i.e., layer 63, will be in overlapping relation with itself with adhesive therebetween. Since the layer 63 is overlapping and adhesively secured to itself, a waterproof innermost layer will be provided. In the form of FIGURES 11–13, strip 71 forms a portion of the innermost layer by overlapping the overlapped seam between adjacent convolutions of layer 63. In each instance, the innermost surface 61 is a continuous surface of nonporous material. The layers 64, 66 and 68 are preferably made of paper and provide sufficient rigidity to the tubing so that it may be utilized as a container body. The layer of wax 75 provides a waterproof seal in addition to the seal between the overlap of layer 63.

In the preferred form of tubing, both the inner and outermost layers are composed of an overlapping nonporous and noncorrosive material adhesively secured to itself at the overlapped portions thereby providing inner and outer waterproof layers. The intermediate layers are preferably a lightweight material such as paper. The resultant tubing of the present invention is capable of being utilized as container bodies adapted to contain liquids, while at the same time are substantially lighter in weight than metallic can bodies.

I claim:

1. A hollow tubing comprising a spiral wound laminated tubing, the innermost layer of said tubing comprising a spiral wound laminate, which laminate comprises a strip of nonporous material defining generally the inner surface of said tubing, a layer of porous material on one surface of said layer of nonporous material, the width of said layer of porous material being less than the width of said layer of nonporous material thereby defining a flap portion at one side edge of said layer of nonporous material, and a layer of dry bonding material on said flap portion, said flap portion overlapping the edge of the next adjacent convolution of said laminate on the inner surface of the tubing at the seam between porous material portions of said laminate, and said bonding material bonding said flap to said next convolution at the overlap, said porous material abutting at said seam between adjacent convolutions.

2. A hollow tubing comprising a spiral wound laminated tubing, the innermost layers of said tubing comprising a spiral wound laminate, which laminate comprises an elongate flexible strip of nonporous material selected from the class consisting of metal foil and plastic film, a layer of normally absorbent material adhesively secured to one surface of said layer of nonporous material, the width of said layer of absorbent material adhesively secured to said layer of nonporous material being less than the width of said layer of nonporous material thereby defining a flap portion consisting of said nonporous material along a side edge of said layer of nonporous material, and a layer of dry bonding material on said one surface over said flap portion sufficient to improve the rigidity of said flap portion, said flap portion overlapping the edge of the next adjacent convolution of said laminate on the inner surface of the tubing and said bonding material bonding said flap to said next convolution at the overlap.

3. A hollow tubing comprising a spiral wound laminated tubing, the innermost layers of said tubing comprising a spiral wound adjacent convolution of a laminate, which laminate comprises a first elongated strip of nonporous material having opposing generally parallel edges, a layer of porous material adhesively secured to one surface of said layer of nonporous material, a second elongated strip consisting of nonporous material adhesively secured to the other surface of said first strip and along one edge thereof, said second strip overhanging said one edge to define a flap portion along said one edge, said flap portion overlapping the edge of the next adjacent convolution of said laminate at the inner surface thereof, and bonding material adhering said flap to the inner surface of said next adjacent convolution.

4. A hollow tubing comprising a spiral wound laminated tubing, the innermost layers of said tubing comprising a spiral wound laminate, which laminate comprises a first strip of nonporous material for defining the inner surface of the tubing, a layer of normally absorbent material adhesively secured to an opposite surface of said layer of nonporous material, the width of said layer of absorbent material secured to said layer of nonporous material being less than the width of the layer of said nonporous material thereby defining a first flap along the side edge of said layer of nonporous material, a second elongated strip of nonporous material adhesively secured along the edge of said first flap for strengthening said first flap and overhanging said first flap for defining a second flap, and a layer of dry bonding material on the surface of said second flap facing said first strip of nonporous material sufficient to enhance the rigidity of said second flap before spiral winding said laminate, said first and second flaps overlapping the edge of the next adjacent convolution of said spiral wound laminate and bonded to the inner surface thereof.

5. A hollow tubing comprising a spirally wound laminate having a plurality of layers of spirally wound material, the innermost layer being a layer of nonporous material with a layer of wax on its inner exposed surface and having adjacent overlapping edges, and a layer of the laminate exteriorly of said innermost layer being a layer of porous material isolated from exposure to the interior of said hollow tubing by said layer of nonporous material, the spirally wound material of said porous layer being of less width than the spirally wound material of said nonporous material.

6. A hollow tubing comprising a spirally wound laminate having a plurality of layers of spirally wound material, the innermost layer being a layer of nonporous material having adjacent overlapping edges, and a layer of the laminate entirely exteriorly of said innermost layer being a layer of porous material abutting at its edges between convolution and isolated from exposure to the interior of said hollow tubing by said layer of nonporous material, the spirally wound material of said porous layer being of less width than the spirally wound material of said nonporous material, defining a flap consisting of nonporous material extending beyond the edge of said porous material to overlap the seam between adjacent convolutions, and means bonding the outer surface of the flap to the inner surface of the innermost layer in the next adjacent convolution beyond the seam.

7. The hollow tubing of claim 6 wherein said layer of nonporous material has an inner exposed surface and a layer of slip coat material on said inner exposed surface.

8. A hollow tubing comprising a spirally wound laminate having a plurality of layers of spirally wound material, the innermost layer being a layer of nonporous material coated on its inner exposed surface with a layer of wax, adjacent edges of said nonporous material being overlapped, a layer of waterproof adhesive joining said overlapped edges, and a layer of the laminate exteriorly of said innermost layer being a layer of porous material isolated from the interior of said hollow tubing by said layer of nonporous material, the spirally wound material of said layer of porous material being of less width than the spirally wound material of said layer of nonporous material.

9. A hollow tubing comprising a spirally wound laminate having a plurality of layers of spirally wound material, the innermost layer being a layer of nonporous strip material, adjacent edges of said nonporous material being overlapped, a layer of waterproof adhesive joining said overlapped edges, and a layer of the laminate entirely exteriorly of said innermost layer being a layer of porous material prebonded to said innermost layer with one edge in registry with an edge of said nonporous material and isolated from the interior of said hollow tubing by said layer of nonporous material, the spirally wound material of said layer of porous material being of less width than the spirally wound material of said layer of nonporous material providing an outwardly extending flap along the other edge of said porous material consisting of nonporous material, and means bonding the outwardly extending flap to the inner surface of said innermost layer in the next adjacent convolution to define said overlapped edges.

10. A hollow tubing comprising a spirally wound laminate having a plurality of layers, the innermost layer being a layer of spirally wound nonporous strip material coated on its inner exposed surface with a layer of wax, adjacent edges of said nonporous layer being overlapped and bonded to each other, a spirally wound layer of porous strip material exteriorly of said layer of nonporous material and narrower than said first mentioned strip material so that adjacent edges of said layer of porous material abut each other at a spiral seam, a lyer of bonding mterial bonding said porous material to the outer surface of said nonporous material, the outermost layer of said laminate comprising a layer of nonporous material, adjacent edges of the outermost layer of nonporous material being overlapped, and a layer of waterproof adhesive joining said last mentioned overlapped edges.

11. A hollow tubing comprising a spirally wound laminate having a plurality of layers, the innermost layer being a layer of spirally wound nonporous strip material, adjacent edges of said nonporous layer being overlapped and bonded to each other, a spirally wound layer of porous strip material entirely exteriorly of said layer of nonporous material and narrower than said first mentioned strip material so that adjacent edges of said layer of porous material in adjacent convolutions abut each other at a spiral seam to define an outwardly extending flap consisting of nonporous material which extends beyond the porous material at the seam, means bonding the outwardly extending flap to the inner surface of the innermost layer in the next adjacent convolution beyond the seam, a layer of bonding material bonding said porous material to the outer surface of said nonporous material, the outermost layer of said laminate comprising a layer of nonporous material, adjacent edges of the outermost layer of nonporous material being overlapped, and a layer of waterproof adhesive joining said last mentioned overlapped edges.

12. An article of manufacture comprising a hollow spirally wound laminated tubing, the three innermost layers of said tubing being a laminate, said laminate including a layer of metal foil coated on its inner exposed surface with a layer of wax, a layer of paper bonded to said layer of metal foil on a surface thereof remote from the layer of wax, the layer of paper having a width less than the width of said layer of metal foil thereby defining a flap portion along a side edge of said layer of metal foil, the flap portion on said layer of metal foil overlapping an adjacent side edge of said layer of metal foil, and a layer of waterproof adhesive joining said overlapped portions.

13. An article of manufacture in accordance with claim 12 wherein the outermost layer of said tubing is a layer of metal foil having overlapped edges, and a waterproof adhesive between said last mentioned overlapped edges.

14. A hollow tubing comprising a spirally wound laminated tubing, the innermost layers of said tubing comprising a spirally wound laminate, which laminate comprises an elongated strip of metal foil, a thin layer of wax coated on one surface of said layer of metal foil, a layer of paper adhesively secured to an opposite surface of said layer of metal foil, and the width of said layer of paper adhesively secured to said layer of metal foil being less than the width of said layer of metal foil thereby defining a flap portion along the side edge of said layer of metal foil.

15. The hollow tubing in accordance with claim 14 wherein a side edge of said layer of paper is folded over against itself thereby providing a narrow strip of reinforcement.

References Cited

UNITED STATES PATENTS

| | | | |
|---|---|---|---|
| 2,262,242 | 11/1941 | Lenox | 229—4.5 |
| 2,315,217 | 3/1943 | Obiglio | 229—4.5 |
| 2,355,584 | 8/1944 | Douglas | 138—144 |
| 2,555,380 | 6/1951 | Stuart et al. | 229—3.5 |
| 2,785,700 | 3/1957 | Yovanovich | 138—144 |
| 2,848,151 | 8/1958 | O'Neil | 229—3.5 |
| 2,998,339 | 8/1961 | Barnes et al. | 93—84 |
| 3,018,212 | 1/1962 | Chinn | 229—4.5 |
| 3,162,347 | 12/1964 | Taylor | 229—4.5 |

LAVERNE D. GEIGER, *Primary Examiner.*

SAMUEL ROTHBERG, *Examiner.*

H. K. ARTIS, *Assistant Examiner.*